United States Patent
Matsuzaki

(10) Patent No.: US 10,245,847 B2
(45) Date of Patent: Apr. 2, 2019

(54) REACTION SOLUTION AND INK JET RECORDING METHOD

(71) Applicant: Seiko Epson Corporation, Tokyo (JP)

(72) Inventor: Akiko Matsuzaki, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/703,157

(22) Filed: Sep. 13, 2017

(65) Prior Publication Data

US 2018/0086112 A1 Mar. 29, 2018

(30) Foreign Application Priority Data

Sep. 29, 2016 (JP) .................................. 2016-191289

(51) Int. Cl.
| | | |
|---|---|---|
| C09D 11/03 | (2014.01) |
| C09D 11/033 | (2014.01) |
| B41J 11/00 | (2006.01) |
| B41J 2/01 | (2006.01) |
| C09D 11/108 | (2014.01) |
| C09D 11/322 | (2014.01) |
| C09D 11/38 | (2014.01) |
| C09D 11/40 | (2014.01) |
| C09D 11/54 | (2014.01) |

(52) U.S. Cl.
CPC ............. B41J 11/0015 (2013.01); B41J 2/01 (2013.01); C09D 11/03 (2013.01); C09D 11/033 (2013.01); C09D 11/108 (2013.01); C09D 11/322 (2013.01); C09D 11/38 (2013.01); C09D 11/40 (2013.01); C09D 11/54 (2013.01)

(58) Field of Classification Search
CPC ....... B41J 11/0015; B41J 2/01; C09D 11/108; C09D 11/033; C09D 11/03
See application file for complete search history.

(56) References Cited

U.S. PATENT DOCUMENTS

| | | | |
|---|---|---|---|
| 6,027,210 A | 2/2000 | Kurabayashi et al. | |
| 8,210,672 B2 * | 7/2012 | Mukai | B41J 2/175 347/100 |
| 2008/0152825 A1* | 6/2008 | Mukai | B41M 5/0011 427/466 |
| 2009/0231407 A1 | 9/2009 | Kachi | |
| 2010/0196604 A1* | 8/2010 | Kariya | C09D 11/322 427/288 |
| 2012/0169815 A1 | 7/2012 | Katsuragi | |
| 2013/0321525 A1 | 12/2013 | Fujii et al. | |

FOREIGN PATENT DOCUMENTS

| | | |
|---|---|---|
| JP | 3825891 B2 | 9/2006 |
| JP | 2006-281568 A | 10/2006 |
| JP | 2006-281586 A | 10/2006 |
| JP | 2008-281586 A | 11/2008 |
| JP | 5064736 B2 | 10/2012 |
| JP | 5068203 B2 | 11/2012 |
| JP | 5371324 B2 | 12/2013 |
| JP | 5516254 B2 | 6/2014 |
| JP | 5655618 B2 | 1/2015 |

* cited by examiner

*Primary Examiner* — Julian D Huffman
*Assistant Examiner* — Michael T Konczal
(74) *Attorney, Agent, or Firm* — Harness, Dickey & Pierce, P.L.C.

(57) ABSTRACT

Provided is a reaction solution containing any one or more kinds of organic solvents from esters, alkylene glycol ethers, cyclic esters, and alkoxyalkyl amides; and an aggregating agent which aggregates components of an ink composition, in which the reaction solution is used for a recording method performed by using the ink composition.

30 Claims, No Drawings

REACTION SOLUTION AND INK JET RECORDING METHOD

BACKGROUND

1. Technical Field

The present invention relates to a reaction solution and an ink jet recording method.

2. Related Art

In the related art, an ink jet recording method in which an image is recorded on a recording medium by discharging fine ink droplets from a nozzle of a recording head of an ink jet recording apparatus is well-known. In recent years, an ink jet recording method has been widely used not only for recording an image on a recording medium (such as plain paper) having excellent ink absorbency, but also for recording an image on a (low absorbent) recording medium (such as art paper and coated paper) having low ink absorbency, and for recording an image on a (non-absorbent) recording medium (such as a plastic film) which hardly absorbs ink. In addition, using an aqueous ink which is based on water is considered even for inks used for recording images for such a low absorbent or non-absorbent recording medium from the viewpoint of global environment and safety.

As compared with a non-aqueous ink which is based on an organic solvent, the aqueous ink has the property of being easily repelled on a low absorbent recording medium or a non-absorbent recording medium. For this reason, color unevenness was likely to occur in an image recorded on the low absorbent or non-absorbent recording medium. From this viewpoint, for example, it has been attempted to react a reaction solution containing a polyvalent metal salt and the like with an aqueous (water-based) ink composition on a low absorbent recording medium (JP-A-2006-281586 and JP-A-2006-281568).

As described above, it is considered that problems such as ink bleeding in an image are suppressed by using a reaction solution and bringing it into contact with ink on a recording medium. However, in the techniques disclosed in JP-A-2006-281586 and JP-A-2006-281568, wettability of the reaction solution with respect to the recording medium is not necessarily sufficiently studied, and there are some cases where the wettability is insufficient and the image quality is deteriorated. Further, in the above-described techniques, permeability and dryness of the reaction solution are not necessarily sufficiently studied, which may result in insufficient performance of the image quality or the like.

According to the studies of the inventors, it has been found that adjusting the composition of the reaction solution so as to make the wettability, the permeability, and the dryness desirable is an important factor in order to obtain a recorded matter with high image quality. Moreover, it has been found that the solubility of the aggregating agent and the permeability and evaporation behavior of the organic solvent in the reaction solution are important factors.

SUMMARY

An advantage of some aspects of the invention is to provide a reaction solution as a pretreatment liquid, which is capable of forming an image with excellent image quality on a recording medium by using an ink composition. In addition, another advantage of some aspects of the invention is to provide an ink jet recording method which is capable of forming an image with excellent image quality on a recording medium by using an ink composition.

The invention can be realized in the following aspects or application examples.

According to a first aspect of a reaction solution of the present invention, a reaction solution contains any one or more kinds of organic solvents from esters, alkylene glycol ethers, cyclic esters, and alkoxyalkyl amides; and an aggregating agent which aggregates components of an ink composition, in which the reaction solution is used for a recording method performed by using the ink composition.

When the reaction solution is used as a pretreatment liquid, it is possible to form an image with excellent image quality by applying an ink composition on a recording medium. More specifically, with any one or more kinds of organic solvents of esters, alkylene glycol ethers, cyclic esters, and alkoxyalkyl amides, the wettability, the permeability, and the dryness of the reaction solution with respect to the recording medium is controlled, and thereby it is possible to evenly spread and adhere the aggregating agent on the recording medium. For this reason, components of the ink composition is easily in contact with the recording medium and thus the reaction can proceed satisfactorily and an image with high image quality can be formed. In addition, with the organic solvent, it is easy to maintain the solubility of the aggregating agent until the end of the process of drying the reaction solution without deteriorating degree of solubility of the aggregating agent, and the wetting spreadability can be maintained, thereby more evenly spreading and adhering the aggregating agent on the recording medium.

In the reaction solution according to the invention, the recording method may be performed by discharging the ink composition and the reaction solution from an ink jet recording head so as to be adhered to a recording medium.

The reaction solution according to the invention may be an aqueous composition containing water.

In such a reaction solution, the evaporation of water occurs prior to the evaporation of the organic solvent, and the period during which the aggregating agent is dissolved and held in the remaining organic solvent can be made long. With this, it is possible to obtain better wetting spreadability on the recording medium. Since such a reaction solution is aqueous, safety and the like are even better.

In the reaction solution according to the invention, the organic solvent may include an organic solvent having a standard boiling point in a range of 150° C. to 280° C.

In such a reaction solution, the wetting spreadability and the dryness are balanced better, and it is easy to form a high image quality.

In the reaction solution according to the invention, a total content of the organic solvent may be in a range of 1% by mass to 30% by mass with respect to the total mass of the reaction solution.

In such a reaction solution, the wetting spreadability and the dryness are balanced better, and it is easy to form a high image quality.

The reaction solution according to the invention may contain, as the organic solvent, an organic solvent of which a degree of solubility is equal to or greater than 1% by mass with respect to an aqueous solution having a concentration of 2-pyrrolidone of 20% by mass.

In such a reaction solution, the aggregating agent can be spread and adhered even more evenly on the recording medium without deteriorating the solubility of the aggregating agent.

In the reaction solution according to the invention, a total content of the organic solvent of which the standard boiling point is higher than 280° C. may be equal to or less than 5% by mass with respect to the total mass of the reaction solution.

According to such a reaction solution, the dryness of the reaction solution is more excellent.

In the reaction solution according to the invention, a content of the ink composition may be equal to or less than 5% by mass with respect to the total mass of the ink composition of the organic solvent of which the standard boiling point is higher than 280° C.

According to such a reaction solution, the dryness of the image is more excellent.

The reaction solution according to the invention may contain, as the organic solvent, an organic solvent having a water octanol distribution coefficient in a range of −1 to 4.

According to such a reaction solution, the aggregating agent can be spread and adhered even more evenly on the recording medium without deteriorating the solubility of the aggregating agent.

In the reaction solution according to the invention, the recording method may be to perform recording on an ink non-absorbent or ink low absorbent recording medium.

According to such a reaction solution, the reaction solution can be evenly spread and adhered on the recording medium without being repelled on the recording medium, and thus it is possible to more easily form a predetermined image by using an ink composition.

In the reaction solution according to the invention, a surface energy of the recording medium may be equal to or greater than 30 mN/m.

According to such a reaction solution, the reaction solution can be evenly spread and adhered on the recording medium having the surface energy of equal to or greater than 30 mN/m, and thus it is possible to easily form an image with high image quality by using an ink composition.

The reaction solution according to the invention may contain, as the aggregating agent, any one or more of a polyvalent metal salt, an organic acid, and a cationic compound.

According to such a reaction solution, an aggregation effect is more excellent, and thus it is possible to form an image with high image quality.

The reaction solution according to the invention may further contain as an organic solvent, cyclic amides or in which an organic solvent contains alkoxyalkyl amides.

According to such a reaction solution, the aggregating agent can be spread and adhered even more evenly on the recording medium without deteriorating the solubility of the aggregating agent. In addition, when the reaction solution permeates into the recording medium, the dryness is also excellent.

In the reaction solution according to the present invention, the ink composition may contain an organic solvent having a water octanol distribution coefficient of equal to or less than 0.

According to another aspect of the invention, there is provided an ink jet recording method performed by using the ink composition and the reaction solution.

In such an ink jet recording method, the above-described reaction solution is used as a pretreatment liquid, and thus it is possible to form an image with high image quality on the recording medium by using an ink composition. More specifically, the reaction solution is excellent in the wettability with respect to the recording medium, and is likely to evenly wet and spread to the recording medium in a wide range by using any one or more kinds of organic solvents from esters, alkylene glycol ethers, cyclic esters, and alkoxyalkyl amides. In addition, the permeability and the dryness of the reaction solution are controlled, and thus the aggregating agent can be evenly spread and adhered on the recording medium. For this reason, the reaction with components of the ink composition can proceed satisfactorily and an image with high image quality can be formed. In addition, in the reaction solution, with the organic solvent, it is possible to maintain the solubility of the aggregating agent until the end of the process of drying the reaction solution without deteriorating degree of solubility of the aggregating agent, and thus the wetting spreadability can be maintained, thereby more evenly spreading and adhering the aggregating agent on the recording medium. With this, it is possible to form an image with high quality.

DESCRIPTION OF EXEMPLARY EMBODIMENTS

Hereinafter, several embodiments of the present invention will be described below. The embodiments described below explain one example of the invention. The invention is not limited to the following embodiments at all, and includes various modifications that are carried out without changing the gist of the invention. Note that, not all of the configurations described below are necessarily indispensable components of the invention.

1. Reaction Solution

The reaction solution of the embodiment is a reaction solution used in a recording method performed by using an ink composition described below, and the reaction solution contains any one or more kinds of organic solvents from esters, alkylene glycol ethers, cyclic esters, and alkoxyalkyl amides, and an aggregating agent which aggregates components of an ink composition.

1.1. Composition of Reaction Solution 1.1.1. Aggregating Agent

The reaction solution of the embodiment contains an aggregating agent which aggregates components of the ink. The aggregating agent has a function of aggregating the coloring material by reacting with components such as coloring materials contained in the ink, a pigment dispersion that can be contained in the ink, and a resin. In addition, the aggregating agent can increase (thicken) the viscosity of the ink composition by reacting with the pigment dispersion and/or the resin that can be contained in the ink composition. For this reason, as the reaction solution and the aggregating agent are brought into contact with each other on the recording medium, the viscosity of the ink adhered to the recording medium is increased and the coloring material contained in the ink becomes insoluble. As a result, the coloring properties of an image recorded with ink can be improved, and occurrence of printing unevenness and the like can be suppressed. With this, the bleeding of the ink composition may be reduced in some cases.

The aggregating agent is not particularly limited, and examples thereof includes a metal salt, an inorganic acid, an organic acid, and a cationic compound. Examples of the cationic compound include a cationic resin (cationic polymer) and a cationic surfactant. Among them, as the metal salt, at least any one of a polyvalent metal salt, an organic acid, and a cationic compound is preferable from the aspect that image quality, abrasion resistance, and glossiness are particularly excellent.

As the metal salt, a polyvalent metal salt is preferable, and metal salts other than the polyvalent metal salt can be also used. Among these aggregating agents, it is preferable to use at least one selected from a metal salt and an organic acid from the viewpoint of excellent reactivity with components contained in the ink composition. Further, among these aggregating agents, it is preferable to use a cationic polymer from the viewpoint of easy dissolution in the reaction solution. A plurality of kinds of the aggregating agents may be used in combination.

By aggregating or precipitating these components by neutralizing the surface charges of the components contained in the ink composition or changing a pH of the ink composition with the aggregating agent, the ink compositions are aggregated or thickened. Examples of the component which is contained in the ink composition and reacts with the aggregating agent include a coloring material and a resin described below.

The polyvalent metal compound among metal salts is not limited as described below, and examples thereof include a titanium compound, a chromium compound, a copper compound, a cobalt compound, a strontium compound, a barium compound, an iron compound, an aluminum compound, a calcium compound, and a magnesium compound, and salts (polyvalent metal salt) thereof. Among these polyvalent metal compounds, from the viewpoint that the pigments can be effectively aggregated, one or more compounds selected from the groups consisting of an aluminum compound, a calcium compound, and a magnesium compound, and salts thereof is preferable, dissociative salts of alkaline earth metals such as a calcium salt and a magnesium salt are further preferable, and at least one of a calcium salt and a magnesium salt is still further preferable.

In addition, the polyvalent metal salt is a compound consisting of a divalent or higher valent metal ion and anion. Examples of the divalent or higher valent metal ion include ions such as calcium, magnesium, copper, nickel, zinc, barium, aluminum, titanium, strontium, chromium, cobalt, and iron. Among the metal ions constituting the polyvalent metal salt, at least one of a calcium ion and a magnesium ion is preferable from the viewpoint of excellent cohesion of color materials and the like.

An anion constituting a polyvalent metal salt is an inorganic ion. That is, the polyvalent metal salt in the invention consisting of an inorganic ion and a polyvalent metal. Examples of such an inorganic ion include a chloride ion, a bromide ion, an iodide ion, a nitrate ion, a sulfate ion, and a hydroxide ion.

The polyvalent metal compound is preferably an ionic polyvalent metal salt, and particularly, in a case where the polyvalent metal salt is a magnesium salt and a calcium salt, stability of the reaction solution becomes more excellent. In addition, the counter ion of the polyvalent metal may be any one of an inorganic acid ion and an organic acid ion.

Specific examples of the polyvalent metal salt include calcium carbonate such as heavy calcium carbonate and light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, and copper nitrate. These polyvalent metal salts may be used alone or two or more kinds thereof may be used in combination. Among them, since it is possible to secure sufficient solubility with respect to water, and traces due to the reaction solution are reduced (trace becomes inconspicuous), at least one of magnesium sulfate, calcium nitrate and calcium chloride is preferable, and calcium nitrate is further preferable.

Examples of the metal salt other than polyvalent metal salt include a monovalent metal salt such as sodium salt and potassium salt. Also, sodium sulfate and potassium sulfate are exemplified.

In addition to the above examples, examples of the polyvalent metal compound include an inorganic pigment such as chalk, kaolin, calcined clay, talc, titanium oxide, zinc oxide, zinc sulfide, synthetic silica, aluminum hydroxide, alumina, sericite, white carbon, saponite, calcium montmorillonite, sodium montmorillonite, and bentonite, and an organic pigment such as an acrylic plastic pigment and a urea polymer substance.

Preferred examples of the organic acid include a poly (meth)acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furancarboxylic acid, pyridine carboxylic acid, coumaric acid, thiophene carboxylic acid, nicotinic acid, or derivatives of these compounds, or salts thereof. The organic acid may be used alone or two or more kinds thereof may be used in combination.

Specific examples of the inorganic acid include a sulfuric acid, a hydrochloric acid, a nitric acid, a phosphoric acid, or salts thereof. The inorganic acid may be used alone or two or more kinds thereof may be used in combination.

Examples of the cationic resin (cationic polymer) include a cationic urethane resin, a cationic olefin resin, and a cationic allylamine resin.

As the cationic urethane resin, it is possible to appropriately select and use known resins. As the cationic urethane resin, commercially available products can be used. For example, HYDRAN CP-7010, CP-7020, CP-7030, CP-7040, CP-7050, CP-7060, and CP-7610 (product name, produced by DIC Corporation), SUPER FLEX 600, 610, 620, 630, 640, and 650 (product name, produced by Dai-Ichi Kogyo Seiyaku Co., Ltd.), and urethane emulsion WBR-2120C and WBR-2122C (product name, produced by TAISEI FINE CHEMICAL CO., LTD.) can be used.

The cationic olefin resin contains olefin such as ethylene or propylene as a structural skelton, and it is possible to appropriately select and use known resins. In addition, the cationic olefin resin may be in an emulsion state of being dispersed in a solvent containing water and an organic solvent. As the cationic olefin resin, commercially available products can be used, and the examples thereof include ARROWBASE CB-1200 and CD-1200 (product name, produced by UNITIKA LTD).

As the cationic allylamine resin (cationic polymer), the known resins can be appropriately selected to be used, and the examples thereof include poly allylamine hydrochloride, poly allylamine amide sulfate, allylamine hydrochloride.diallylamine hydrochloride copolymer, an allylamine acetate-.diallylamine acetate copolymer, an allylamine acetate.diallylamine acetate copolymer, an allylamine hydrochloride.dimethyl allylamine hydrochloride copolymer, an allylamine.dimethyl allylamine copolymer, poly diallylamine hydrochloride, poly methyl diallylamine hydrochloride, poly methyl diallylamine amide sulfate, poly methyl diallylamine acetate, poly diallyl dimethyl ammonium chloride, diallylamine acetate.sulfur dioxide copolymer, diallyl methyl ethyl ammonium ethyl sulfate.sulfur dioxide copolymer, methyl diallylamine hydrochloride.sulfur dioxide copolymer, diallyl dimethyl ammonium chloride.sulfur dioxide copolymer, and diallyl dimethyl ammonium chloride.acrylamide copolymer. As the cationic allylamine resin, commercially available products can be used, and the examples thereof include PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (product name, produced by NITTOBO MEDICAL CO., LTD.), HYMO Neo-600, HYMOLOC Q-101, Q-311, and Q-501, and HIMAX SC-505 and SC-505 (product name, produced by HYMO Co., Ltd.)

As the cationic amine polymer, UNISENCE KHE103L (hexamethylenediamine/epichlorohydrin resin, pH of 1% aqueous solution is approximately 5.0, viscosity in a range of 20 to 50 (mPa·s), and aqueous solution having a solid content concentration of 50% by mass), and UNISENCE KHE104L (dimethyl amine/epichlorohydrin resin, pH of 1% aqueous solution is approximately 7.0, and viscosity in a range of 1 to 10 (mPa·s), and aqueous solution having a solid content concentration of 20% by mass) produced by Senka.

Examples of the cationic surfactant include primary, secondary, and tertiary amine salt-type compounds, an alkyl amine salt, a dialkyl amine salt, an aliphatic amine salt, a benzalkonium salt, a quaternary ammonium salt, a quaternary alkylammonium salt, an alkyl pyridinium salt, a sulfonium salt, a phosphonium salt, an onium salt, and an imidazolinium salt. The specific examples thereof include hydrochlorides or acetates of lauryl amine, coconut-type amine, rosin amine, lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyl lauryl ammonium hydrochloride, cetyl pyridinium chloride, cetyl pyridiniumbromide, dihydroxyethyl lauryl amine, decyl dimethyl benzyl ammonium chloride, dodecyl dimethyl benzyl ammonium chloride, teproductcyl dimethyl ammonium chloride, hexadecyl dimethyl ammonium chloride, and octadecyl dimethyl ammonium chloride.

A plurality of kinds of the aggregating agents may be used. In addition, among the aggregating agents, when selecting at least one from a polyvalent metal salt, an organic acid, and a cationic compound, the aggregation effect becomes more excellent, and thus it is possible to form an image with high image quality (particularly, with excellent coloring properties).

The total content of the aggregating agent in the reaction solution can be appropriately determined such that the above-described effects are exhibited. For example, the content is preferably in a range of 0.1% by mass to 40% by mass, and is further preferably in a range of 2% by mass to 25% by mass, with respect to the total mass of the reaction solution. When the content of the aggregating agent is equal to or greater than 0.1% by mass, a function of aggregating components in which the aggregating agent is contained in the ink composition is further improved. In addition, when the content of the aggregating agent is equal to or less than 30% by mass, the solubility of the aggregating agent in the reaction solution is further excellent, and the storage stability of the reaction solution or the like can be improved.

The mol concentration of the aggregating agent contained in the reaction solution is preferably in a range of 0.05 mol/kg to 1.3 mol/kg, and is further preferably in a range of 0.05 mol/kg to 1.0 mol/kg. When the concentration of the aggregating agent is equal to or greater than 0.05 mol/kg, a function of aggregating components in which the aggregating agent is contained in the ink composition is further improved. In addition, when the concentration of the aggregating agent is equal to or less than 1.3 mol/kg, the solubility of the aggregating agent in the reaction solution is further excellent, and the storage stability of the reaction solution or the like can be improved. In addition, in the specification, the concentration [mol/kg] of the aggregating agent contained in the reaction solution is indicated by the calculation obtained by dividing the substance amount [mol] of the aggregating agent contained in the reaction solution by the total mass [kg] of the reaction solution (that is, containing a polyvalent metal salt).

At the time of applying a reaction solution to a non-absorbent recording medium or a low absorbent recording medium (described below), the aggregating agent is applied such that the adhesion amount of the aggregating agent contained in the reaction solution is preferably in a range of 0.05 mmol/m$^2$ to 3 mmol/m$^2$, and is further preferably in a range of 0.05 mmol/m$^2$ to 2.5 mmol/m$^2$. When the aggregating agent is applied such that the adhesion amount of the aggregating agent is equal to or greater than 0.05 mmol/m$^2$, it is possible to promote the aggregation of the coloring material and to improve the recorded image quality. In addition, when the aggregating agent is applied such that the adhesion amount of the aggregating agent is equal to or less than 3.0 mmol/m$^2$, it is possible to suppress precipitation of an aggregating agent from a recording portion, and when the coating amount of the reaction solution is reduced, it is possible to shorten the time for drying the reaction solution, thereby increasing the recording speed.

From the viewpoint that the solubility of the aggregating agent in the reaction solution becomes excellent even with high hydrophobicity of the organic solvent contained in the reaction solution, as the aggregating agent, degree of solubility is preferably equal to or greater than 1 g with respect to 100 g of water at 25° C., and is further preferably in a range of 3 g to 80 g.

1.1.2. Water

The reaction solution according to the embodiment may contain water. The water functions as a main medium of the reaction solution, and is evaporated and dispersed by drying. As the water, pure water such as ion exchanged water, ultrafiltrated water, reverse osmotic water, and distilled water, or water from which ionic impurities are completely removed such as ultrapure water is preferable. Also, when water sterilized by irradiation with ultraviolet rays or addition of hydrogen peroxide is used, it is possible to prevent generation of fungi or bacteria when the reaction solution is stored for a long period of time, which is preferable.

The content of water included in the reaction solution may be, for example, equal to or greater than 50% by mass, or may be equal to or greater than 60% by mass, with respect to the total mass of the reaction solution.

1.1.3. Organic Solvent

The reaction solution according to the embodiment may contain an organic solvent. The organic solvent has a function of increasing wettability of the reaction solution with respect to the non-absorbent recording medium. Examples of the organic solvent include at least one kind of esters, alkylene glycol ethers, cyclic esters, and alkoxyalkyl amides. In addition, the organic solvent may contain nitrogen-containing compounds, saccharides, and amines.

Esters

Examples of the esters which can be contained as an organic solvent as the reaction solution of the embodiment include compounds represented by Formulae (1) and (2).

$$CH_3-CO(OR^1)_aOR^2 \quad (1)$$

(In the formula, $R^1$ represents an alkylene group having to 4 carbon atoms, $R^2$ represents hydrogen or an alkyl group having 1 to 3 carbon atoms, and a represents an integer in a range of 1 to 3. The alkylene group and the alkyl group may be linear or branched.)

Examples of the compounds represented by Formula (1) include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate.

$$CH_3-CO(OR^3)_bOCOR^4 \quad (2)$$

(In the formula, $R^4$ represents an alkylene group having 2 to 4 carbon atoms, $R^4$ represents an alkyl group having 1 to 3 carbon atoms, b represents an integer of 1 to 6. The alkylene group and the alkyl group may be linear or branched.)

Examples of the compounds represented by Formula (2) include glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

Alkylene Glycol Ethers

As the alkylene glycol ethers which can be contained as an organic solvent as the reaction solution of the embodiment, monoether or diether of alkylene glycol may be used, alkyl ether is preferable, and the compounds represented by Formula (3) are preferable.

$$R^5-(OR^6)_cOR^7 \quad (3)$$

(In the formula, $R^6$ represents an alkylene group having 2 to 5 carbon atoms, $R^5$ and $R^7$ each independently represent hydrogen or an alkyl group having 1 to 6 carbon atoms, but both of $R^5$ and $R^7$ are not hydrogen at the same time, and c represents an integer of 1 to 5.)

The alkylene group and the alkyl group may be linear or branched. In a case of a branched shape, an alkylene group which may be substituted with an alkyl group having 1 to 2 carbon atoms, or an alkyl group can be exemplified.

From the viewpoint that the abrasion resistance, the glossiness, the image quality, and the like are excellent, c is preferably equal to or less than 3, and is further preferably equal to or less than 2. The number of carbon atoms of $R^6$ is preferably 2 to 4, and is further preferably 2 to 3. In a case where $R^5$ and $R^7$ are alkyl groups, the number of carbon atoms is preferably 1 to 4, and is further preferably 1 to 3. In addition, from the viewpoint that the image quality and the abrasion resistance are particularly excellent, diether of alkylene glycol is preferable.

Examples of compounds represented by Formula (3) include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylenglycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether; and alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl etherglycol methyl ethyl ether, triethylene glycol dimethyl ether, triethylene glycol diethyl ether, triethylene glycol dibutyl ether, triethylene glycol methyl butyl ether, tetraethyleneglycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Among such alkylene glycol monoalkyl ethers, $R^5$ or $R^7$ is hydrogen, alkoxy alcohols in which c is are particularly preferable from the viewpoint of improving the solubility of the aggregating agent and the wetting spreadability in recording medium the recording medium.

In addition, the diether is further preferable than the above-described monoether of alkylene glycol from the viewpoint of easily dissolving or swelling resin particles in the ink composition described later, and improving the abrasion resistance of the formed image.

Cyclic Esters

Examples of the cyclic esters which can be contained as an organic solvent as the reaction solution of the embodiment include compounds represented by Formula (4).

(In Formula (4), $R^8$ represents hydrogen or an alkyl group having 1 to 4 carbon atoms, and d represents an integer of 0 to 3. In addition, the alkyl group may be linear or branched.)

Examples of compounds represented by Formula (4) include cyclic esters (lactones) such as ε-propiolactone, γ-butyrolactone, δ-valerolactone, ε-caprolactone, ε-butyrolactone, ε-valerolactone, γ-valerolactone, ε-hexanolactone, γ-hexanolactone, δ-hexanolactone, ε-heptanolacone, γ-heptanolacone, δ-heptanolacone, ε-heptanolacone, γ-octanolactone, δ-octanolactone, ε-octanolactone, δ-nonalactone, ε-nonalactone, and ε-nonalactone, and a compound in which the hydrogen of the methylene group adjacent to the carbonyl group is substituted with an alkyl group having 1 to 4 carbon atoms.

Alkoxyalkyl Amides

Examples of the alkoxyalkyl amides which can be contained as an organic solvent as the reaction solution of the embodiment include compounds represented by Formula (5).

$$R^9O-CH_2CH_2-CO-NR^{10}R^{11} \quad (5)$$

(In formula (5), $R^9$ represents an alkyl group having 1 to 4 carbon atoms, and $R^{10}$ and $R^{11}$ each independently represent an alkyl group having 1 to 2 carbon atoms.)

The compounds represented by Formula (5) is a ε-alkoxy-propionamide compound, and examples thereof include 3-methoxy-N,N-dimethyl propionamide, 3-methoxy-N,N-diethyl propionamide, 3-methoxy-N,N-methyl ethyl propionamide, 3-ethoxy-N,N-dimethyl propionamide, 3-ethoxy-N,N-diethyl propionamide, 3-ethoxy-N,N-methyl ethyl propionamide, 3-n-butoxy-N,N-dimethyl propionamide, 3-n-butoxy-N,N-diethyl propionamide, 3-n-butoxy-N,N-methyl ethyl propionamide, 3-n-propoxy-N,N-dimethyl propionamide, 3-n-propoxy-N,N-diethyl propionamide, 3-n-propoxy-N,N-methyl ethyl propionamide, 3-iso-propoxy-N,N-dimethyl propionamide, 3-iso-propoxy-N,N-diethyl propionamide, 3-iso-propoxy-N,N-methyl ethyl propionamide, 3-tert-butoxy-N,N-dimethyl propionamide, 3-tert-butoxy-N,N-diethyl propionamide, and 3-tert-butoxy-N,N-methyl ethyl propionamide.

As the reaction solution of the embodiment, the above-described organic solvent may be used alone, or two or more kinds thereof may be used in combination. The cyclic esters 5-membered cyclic γ-lactones. For example, when γ-butyrolactone and γ-valerolactone are used, it may be possible to further improve the print quality.

In the reaction solution of the embodiment, total content of the organic solvent is preferably in a range of 1% by mass to 30% by mass, is further preferably in a range of 2% to 20% by mass, and is still further preferably in a range of 5% to 15% by mass, with respect to the total mass of the reaction solution.

Other Organic Solvents

The reaction solution of the embodiment may contain a heterocyclic compound, a cyclic amide compound, and a nitrogen-containing cyclic compound other than the above-described organic solvents. Examples of such compounds include the compounds represented by Formula (6).

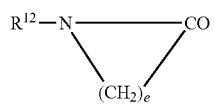

(6)

(In Formula (6), $R^{12}$ represents hydrogen or an alkyl group having 1 to 4 carbon atoms, and e represents an integer of 0 to 3. In addition, the alkyl group may be linear or branched.)

Examples of the compounds represented by Formula (6) include 2-pyrrolidone, 1-methyl-2-pyrrolidone, 1-ethyl-2-pyrrolidone, 1-propyl-2-pyrrolidone, and 1-butyl-2-pyrrolidone, and 2-pyrrolidone is particularly preferable from the viewpoint of the solubility of the aggregating agent.

In addition, the reaction solution of the embodiment may contain ureas (urea, ethyleneurea, tetramethylurea, thiourea, and 1,3-dimethyl-2-imidazolidinone), betaines (trimethyl glycine, triethyl glycine, tripropyl glycine, triisopropyl glycine, N,N,N-trimethyl alanine, N,N,N-triethyl alanine, N,N,N-triisopropyl alanine, N,N,N-trimethyl methyl alanine, carnitine, and acetylcarnitine) other than the above-described organic solvent.

When the above-described alkoxyalkyl amides, or cyclic amide solvents such as compounds represented by Formula (6) are contained as an organic solvent in the reaction solution of the embodiment, the wetting spreadability on the recording medium of the reaction solution is excellent, and the aggregating agent can be spread and adhered even more evenly on the recording medium without deteriorating the solubility of the aggregating agent, the image quality and glossiness are particularly excellent, which is preferable.

Further, the reaction solution of the embodiment may contain polyhydric alcohols, and particularly, alcohols containing 1,2-alkanediol. Specific examples of alcohols include alcohols (such as methanol, ethanol, 1-propanol, isopropyl alcohol, 1-butanol, 2-butanol, 1-pentanol, and 2-pentanol), 1,2-alkanediol (for example, ethylene glycol, propylene glycol, 1,2-butanediol, 1,2-pentanediol, 1,2-hexanediol, 1,2-heptanediol, 1,2-octanediol), and polyhydric alcohol excluding 1,2-alkanediol (for example, diethylene glycol, dipropylene glycol, 1,3-propanediol, 1,4-butanediol, 1,5-pentanediol, 1,6-hexanediol, 2-ethyl-2-methyl-1,3-propanediol, 2-methyl-2-proply-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerin). Alcohols can be used alone or two or more kinds thereof can be used in combination.

In addition, examples of saccharides that can be contained in the reaction solution of the embodiment include glucose, mannose, fructose, ribose, xylose, arabinose, galactose, aldonic acid, glucitol (sorbit), maltose, cellobiose, lactose, sucrose, trehalose, and maltotriose.

Further, examples of amines that can be contained in the reaction solution of the embodiment include diethanol amine, triethanol amine, and triisopropanol amine. These components are contained in a treatment agent as a pH adjustor.

Here, regarding several organic solvents, a log P value (water octanol distribution coefficient) will be described below. Ethylene glycol diacetate (0.4), ethylene glycol monobutyl ether acetate (1.79), propylene glycol diacetate (0.74), propylene glycol monobutyrate (0.84), propylene glycol dipropionate (1.76), ethylene glycol monobutyl ether (0.83), ethylene glycol monohexyl ether (1.7), ethylene glycol mono-n-hexyl ether (1.57), propylene glycol monoethyl ether (0.3), propylene glycol monopropyl ether (−0.81), propylene glycol monobutyl ether (1.19), diethylene glycol monomethyl ether (−1.18), diethylene glycol monobutyl ether (1.19), diethylene glycol monohexyl ether (1.7), dipropylene glycol monomethyl ether (0.17), dipropylene glycol monoethyl ether (0.68), dipropylene glycol monopropyl ether (0.87), dipropylene glycol monobutyl ether (1.13), triethylene glycol monobutyl ether (0.51), tripropylene glycol monomethyl ether (−0.1), tripropylene glycol monobutyl ether (1.34), polyethylene glycol monomethyl ether (0.8), dipropylene glycol dimethyl ether (1.02), diethylene glycol diethyl ether (0.39), diethylene glycol ethyl methyl ether (0.69), diethylene glycol di-n-butyl ether (1.92), triethylene glycol dimethyl ether (−0.67), tripropylene glycol dimethyl ether (1.46), γ-butyrolactone (−0.64), 3-methoxy-N,N-dimethyl propanamide (0.73), 2-pyrrolidone (−0.85), 1-propanol (0.34), isopropyl alcohol (0.28), 1-butanol (0.88), 2-butanol (0.6), 1-pentanol (1.4), 2-pentanol (1.19), 1,4-butanediol (0.5), 1,5-pentanediol (0.27), 1,2-hexanediol (0.7), 1,2-heptanediol (1.5), 1,2-octanediol (1.3), 3-methyl-1,3-butanediol (0.16), 2-methylpentane-2,4-diol (0.88), 3-methoxy-1-butanol (0.07), 3-methoxy-3-methylbutanol (−0.63), and dipropylene glycol (−0.47). Note that, numbers in parentheses indicate log P values.

Here, "log P value" means an index indicating the hydrophobicity of the compound. The log P value indicates the ratio of the solutes distributed in these two layers in the octanol/water system. In other words, the larger the log P value of the solute is, the higher the hydrophobicity is, and it dissolves well in the octanol phase. Further, the fact that the log P values of the two kinds of substances are approximate means that the hydrophobicity of each is similar. The log P value can be obtained by, for example, a flask shaking method in which a solute and two kinds of solvents are actually put into a flask and are stirred well, and an HPLC method using high performance liquid chromatography (HPLC).

In the reaction solution of the embodiment, it is preferable to use an organic solvent having a Log P value (water octanol distribution coefficient) which is in a range of −1 to 4, is preferably in a range of −1 to 3, and is further preferably in a range of −1 to 1. When such an organic solvent is preferably selected, it is possible to maintain the wettability with respect to the recording medium, and to form an excellent image by using the ink composition without deteriorating the solubility of the aggregating agent. Although the reason why the above-described Log P value is preferable is not clear, it is presumed that in a case where the standard boiling point of the organic solvent is within the preferred range described below, after adhering the reaction solution to the recording medium, in a process in which water first evaporates and then the organic solvent is dried, more organic solvents remain as a component of the reaction solution. In such a state, in the case of the organic solvent having the above-described Log P value, the coating spreadability with respect to the recording medium is excellent up to the end, and the aggregating agent does not segregate so that the aggregating agent can be evenly adhered to the recording medium. With this, ink can react evenly, and thus the image quality and the glossiness are excellent.

The reaction solution is a liquid under the environment of 25° C., and the content of the organic solvent in which a standard boiling point is higher than 280° C. is preferably equal to or less than 5% by mass with respect to the total mass of the reaction solution. The content is preferably equal to or less than 2% by mass, is further preferably equal to or less than 1% by mass, and is particularly preferably equal to or less than 0.5% by mass. The lower limit of the content may be equal to or greater than 0% by mass. With this, dryness of the reaction solution adhered to a non-absorbent recording medium becomes excellent, and adhesiveness of the reaction solution with respect to the non-absorbent recording medium can be improved. Examples of the organic solvent in which the standard boiling point is higher than 280° C. include glycerin, triethanolamine, and polyethylene glycol monomethyl ether.

The reaction solution is a liquid under the environment of 25° C. as the above-described organic solvent, and preferably contains an organic solvent in which the standard boiling point is equal to or lower than 280° C., from the viewpoint that the image quality and the abrasion resistance are particularly excellent. The standard boiling point of the organic solvent is further preferably equal to or lower than 260° C., and is still further preferably equal to or lower than 250° C. Also, the standard boiling point of the organic solvent is further preferably equal to or higher than 150° C., and is still further preferably equal to or higher than 170° C.

Regarding the following organic solvents, the standard boiling point will be described. Ethylene glycol diacetate (187), propylene glycol monobutyrate (206), propylene glycol diacetate (219), ethylene glycol monobutyl ether acetate (192), ethylene glycol monobutyl ether (171), ethylene glycol mono-n-hexyl ether (208), propylene glycol monobutyl ether (170), diethylene glycol monomethyl ether (194), diethylene glycol-n-butyl ether (254.6), diethylene glycol monohexyl ether (259), dipropylene glycol monomethyl ether (194), dipropylene glycol monoethyl ether (203), dipropylene glycol monopropyl ether (210), dipropylene glycol monobutyl ether (231), triethylene glycol monobutyl ether (271), tripropylene glycol monomethyl ether (242), tripropylene glycol monobutyl ether (271), polyethylene glycol monomethyl ether (290), diethylene glycol diethyl ether (189), diethylene glycol ethyl methyl ether (176), diethylene glycol di-n-butyl ether (255), dipropylene glycol dimethyl ether (171), triethylene glycol dimethyl ether (215), tripropylene glycol dimethyl ether (215), γ-butyrolactone (204), 3-methoxy-N, N-dimethylpropanamide (176), 2-pyrrolidone (241), 1,4-butanediol (230), 1,5-pentanediol (235), 1,2-hexanediol (216), 1,2-heptanediol (232), 1,2-octanediol (248), 3-methyl-1,3-butanediol (196), 2-methylpentane-2,4-diol (194), 3-methoxy-1-butanol (161), 3-methoxy-3-methylbutanol (174), and dipropylene glycol (229). Numbers in parentheses indicate a standard boiling point (° C.). In addition, excluding diethylene glycol di-n-butyl ether, the degree of solubility of the organic solvents exhibiting the above-described standard boiling point with respect to an aqueous solution having a concentration of 2-pyrrolidone of 20% by mass is equal to or greater than 1% by mass.

In the reaction solution of the embodiment, in a case of using the above-described organic solvents, and an organic solvent in which the degree of solubility with respect to an aqueous solution having a concentration of 2-pyrrolidone of 20% by mass is equal to or greater than 1% by mass, is preferably equal to or greater than 1.5% by mass, and further preferably equal to or greater than 2% by mass, the solubility of the aggregating agent with respect to the organic solvent is not deteriorated, and thus it is possible to more evenly spread and adhere the aggregating agent on the recording medium, and to obtain an image with high image quality, which is further preferable. The degree of solubility with respect to an aqueous solution having a concentration of 2-pyrrolidone of 20% by mass can be measured (evaluated) through experiments. Specifically, the aqueous solution having 2-pyrrolidone of 20% by mass is adjusted, and the organic solvent having predetermined parts by mass with respect to 100 parts by mass of the adjusted aqueous solution is added and stirred at 25° C. At this time, in a case where liquid separation and turbidity are confirmed by visual observation, it is determined that the organic solvent is not dissolved, and in a case where liquid separation and turbidity are not confirmed by visual observation, it is determined that the organic solvent is dissolved. The addition amount (parts by mass) of the organic solvent added in the largest amount when dissolving is set as a degree of solubility (% by mass).

The total content (total amount) of the organic solvent is preferably in a range of 0.5% by mass to 50% by mass, is further preferably in a range of 1% by mass to 30% by mass, and is still further preferably in a range of 2% by mass to 25% by mass, with respect to the reaction solution. When the content of the organic solvent is within the above-described range, the wetting spreadability and the dryness are balanced better, and it is easy to form a high image quality. In addition, when the content of the organic solvent is within the above-described range, the solubility of the aggregating agent in the reaction solution is not significantly deteriorated.

1.1.4. Other Components

The reaction solution according to the embodiment may contain a resin, an inorganic oxide particle, and a surfactant.

The resin improves the adhesiveness of the reaction solution which is adhered to the non-absorbent recording medium, that is, the resin functions as a resin for fixing. Examples of such a resin include well-known resins such as a urethane resin, an acrylic resin, a styrene acrylic resin, a fluorene resin, a polyolefin resin, a rosin modified resin, a terpene resin, a polyester resin, a polyamide resin, an epoxy resin, a vinyl chloride resin, a vinyl chloride-vinyl acetate copolymer, and an ethylene vinyl acetate resin. These resins may be used alone or two or more kinds thereof may be used in combination. The content of the contained resin can be set to be in a range of 0.1% by mass to 20% by mass with respect to the total mass of the reaction solution.

In a case where the resin is contained in the reaction solution, among the above-described resins, it is preferable to contain a urethane resin, an acylic resin, and a polyolefine resin. When such resins are used, there is a tendency that an effect of improving the adhesiveness of the image with respect to the recording medium becomes further excellent.

The urethane resin is a general name of resin having urethane bond. Examples of the urethane resin include a polyether urethane resin containing an ether bond as a main chain, a polyester urethane resin containing an ester bond as a main chain, and a polycarbonate urethane resin containing a carbonate bond as a main chain in addition to the urethane bond. As the urethane resin, commercially products may be used, examples thereof include SUPER FLEX 460, 460s, 840, and E-4000 (product name, produced by DKS Co., Ltd.), RESAMINE D-1060, D-2020, D-4080, D-4200, D-6300, and D-6455 (product name, produced by Dainichiseika Color&Chemicals Mfg. Co., Ltd.), TAKELAC WS-6021 and W-512-A-6 (product name, produced by Mitsui Chemicals Polyurethanes INC.), SUNCURE 2710 (product name, produced by LUBRIZOL Corporation), and PERMALIN UA-150 (product name, produced by Sanyo Chemical Industries, Ltd).

The acrylic resin is a general name of a polymer obtained by polymerizing at least an acrylic monomer such as (meth)acrylic acid, (meth)acrylate, and acrylamide, acrylonitrile, and the examples thereof include a (meth)acryl resin obtained from the acrylic monomer, and a copolymer of the acrylic monomer and monomers other than the acrylic monomer (for example, a vinyl monomer). As a resin emulsion using the acrylic resin as a raw material, commercially available products may be used, and the examples thereof include FK-854 (product name, produced by CHIRIKA. Co., Ltd.), MOWINYL 952B and 718A (product name, produced by The Nippon Synthetic Chemical Industry Co., Ltd.), NIPOL LX852 and LX874 (product name, produced by ZEON Corporation).

In addition, in the specification, a styrene acrylic resin described below may be used as an acrylic resin. Also, in the specification, the description of (meth)acryl means at least one of acryl and methacryl.

The styrene acrylic resin is a copolymer obtained from a styrene monomer and acrylic monomer, and the examples thereof include a styrene-acrylic acid copolymer, a styrene-methacrylic acid copolymer, a styrene-methacrylic acid-acrylate copolymer, a styrene-α-methylstyrene-acrylic acid copolymer, and a styrene-α-methylstyrene-acrylic acid-acrylate copolymer. As the styrene acrylic resin, commercially available products may be used, and the examples thereof include JONCRYL 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, 7610 (product name, produced by BASF JAPAN LTD.), MOWINYL 966A, 975N (product name, produced by The Nippon Synthetic Chemical Industry Co., Ltd.), and VINYBLAN 2586 (product name, produced by Nissin Chemical Co., Ltd).

The polyolefin resin has olefin such as ethylene, propylene, and butylene as a structural skeleton, and the well-known resins may be appropriately selected to be used. As the olefin resin, commercially available products may be used, and the examples thereof include ARROWBASE CB-1200 and CD-1200 (trade name, manufactured by UNITIKA LTD).

In addition, the resin may be supplied in an emulsion form, and examples of commercially available product thereof include MICRO GEK E-1002 and E-5002 (product name, produced by Nippon Paint Co., Ltd., styrene-acrylic resin emulsion), BONCOAT 4001 (product name, produced by DIC, acrylic resin emulsion), BONCOAT 5454 (product name, produced by DIC, styrene-acrylic resin emulsion), POLYZOLE AM-710, AM-920, AM-2300, AP-4735, and AT-860, and PSASE-4210E (acrylic resin emulsion), POLYZOLE AP-7020 (styrene acrylic resin emulsion), POLYZOLE SH-502 (vinyl acetate resin emulsion), POLYZOLE AD-13, AD-2, AD-10, AD-96, AD-17, and AD-70 (ethylene vinyl acetate resin emulsion), POLYZOLE PSASE-6010 (ethylene vinyl acetate resin emulsion) (product name, produced by Showa Denko K.K.), POLYZOLE SAE1014 (product name, produced by Zeon Corporation, styrene-acrylic resin emulsion), Saibinol SK-200 (product name, produced by Saiden Chemical Industry Co., Ltd., acrylic resin emulsion), AE-120A (product name, acrylic resin emulsion produced byJSR), AE-373D (product name, produced by E-teck. Ltd., carboxy-modified styrene.acrylic resin emulsion), SEIKADYNE 1900W (product name, produced by Dainichiseika Color & Chemicals Mfg. Co., Ltd, ethylene.vinyl acetate resin emulsion), VINYBLAN 2682 (acrylic resin emulsion), VINYBLAN 2886 (vinyl acetate acrylic resin emulsion), VINYBLAN 5202 (acetic acrylic resin emulsion) (product name, produced by Nissin Chemical Industry Co., Ltd.), ELITEL KA-5071S, KT-8803, KT-9204, KT-8701, KT-8904, and KT-0507 (product name, produced by Unitika Co., Ltd., polyester resin emulsion), HI-TEC SN-2002 (product name, produced by TOHO Chemical Industry Co., Ltd., polyester resin emulsion), TAKELAC W-6020, W-635, W-6061, W-605, W-635, and W-6021 (product name, produced by Mitsui Chemicals, Inc.), urethane resin emulsion), SUPER FLEX 870, 800, 150, 420, 460, 470, 610, and 700 (product name, produced by Dai-Ichi Kogyo Seiyaku Co., Ltd., urethane resin emulsion), PERMARIN UA-150 (product name, produced by SANYO CHEMICAL INDUSTRIES, Ltd., urethane resin emulsion), SABCURE 2710 (product name, produced by Lubrizol Corporation, urethane resin emulsion), NEOREZ R-9660, R-9637, and R-940 (product name, produced by Kusumoto Chemicals, Ltd, urethane resin emulsion), ADEKA BONTIGHTER HUX-380 and 290K (product name, produced by ADEKA, urethane resin emulsion), MOWINYL 966A and MOWINYL 7320 (product name, produced by The Nippon Synthetic Chemical Industry Co., Ltd.), JONCRYL 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (product name, produced by BASF JAPAN Ltd.), NK BINDER-R-5HN (product name, produced by SHIN-NAKAMURA CHEMICAL Co., Ltd.), HYDRAN WLS-210 (product name, produced by DIC Corporation, non-crosslinkable polyurethane), and JONCRYL 7610 (product name, produced by BASF JAPAN Ltd).

Examples of the inorganic oxide particles include cationic inorganic oxide particles, anionic inorganic oxide particles, and nonionic inorganic oxide particles. The cationic inorganic oxide particle has a function of enhancing the coloring properties of the recorded image, and examples thereof include silica, alumina, or titanium oxide to which cationic groups are introduced. The anionic or cationic inorganic oxide particles has a function of improving fixability of ink by forming a receptive layer of ink on a non-absorbent recording medium, and examples of anionic inorganic oxide particles include silica sol, titania sol, zirconia sol, and vanadium oxide sol, and examples of nonionic inorganic oxide particles include silica, alumina, and titanium oxide. The content of the contained inorganic oxide particles can be set to be in a range of 0.01% by mass to 15% by mass with respect to the total mass of the reaction solution.

The surfactant has a function of lowering the surface tension and improving the wettability with the recording medium. Among the surfactants, an acetylene glycol surfactant, a silicone surfactant, and a fluorine surfactant can be preferably used.

The acetylene glycol surfactant is not particularly limited, and examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (which are all product names, produced by Air Products and Chemicals. Inc.), OLFINE B, Y, P, A, ST G, SPC, E1004, E1010, PD-001, PD-002W, PD-003, PD-004, EXP.4001, EXP.4036, EXP.4051, AF-103, AF-104, AK-02, SK-14, and AE-3 (which are all product names, produced by Nissin Chemical Industry CO., Ltd.), ACETYLENOL E00, E00P, E40, and E100 (which are all product names, produced by Kawaken Fine Chemicals Co., Ltd).

The silicone surfactant is not particularly limited, and a polysiloxane compound is preferable. The polysiloxane compound is not particularly limited, and examples thereof include polyether-modified organosiloxane. Examples of commercially available products of the polyether-modified organosiloxane include BYK-306, BYK-307, BYK-333, BYK-341, BYK-345, BYK-346, and BYK-348 (which are all product names, produced by BYK-Chemie Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (which are all product names, produced by Shin-Etsu Chemical Co., Ltd).

AS the fluorine surfactant, a fluorine-modified polymer is preferably used, and specific examples thereof include BYK-3440 (product name, produced by BYK-Chemie Japan KK), SURFLON S-241, S-242, and S-243 (product name, produced by AGC SEIMI CHEMICAL CO., LTD.), and FTERGENT 215M (product name, produced by Neos Corporation).

In a case of containing a surfactant, the content can be set to be in a range of 0.1% by mass to 1.5% by mass, with respect to the reaction solution.

The reaction solution according to the embodiment may contain a pH adjustor, an antiseptic agent.antifungal agent, a rust inhibitor, and a chelating agent, as necessary.

1.1.5. Physical Properties of Reaction Solution

Regarding the reaction solution of the embodiment, a surface tension at 25° C. is set to be equal to or lower than 40 mN/m, is preferably set to be equal to or lower than 38 mN/m, is further preferably set to be equal to or lower than 35 mN/m, and is still further preferably set to be equal to or lower than 30 mN/m, from the viewpoint of appropriately setting the wetting spreadability with respect to the recording medium. Note that, the surface tension can be measured by confirming a surface tension at the time of wetting a platinum plate with a composition under an environment of 25° C. using an automatic surface tension meter CBVP-Z (manufactured by Kyowa Interface Science Co., Ltd).

In addition, the reaction solution may be adhered to the recording medium through an ink jet method, and in the case of using the ink jet method, the viscosity at 20° C. is preferably set to be in a range of 1.5 mPa·s to 15 mPa·s, is further preferably in a range of 1.5 mPa·s to 5 mPa·s, and further preferably in a range of 1.5 mPa·s to 3.6 mPa·s.

On the other hand, methods other than the ink jet method may be used for the reaction solution. Examples of the methods include a method of any one or combination of a non-contact type and a contact type such as a method in which the reaction solution is applied to a recording medium using various kinds of spray, a method in which a recording medium is immersed in a reaction solution and applied, and a method in which a reaction solution is applied to a recording medium with a brush.

In a case where the reaction solution is adhered to the recording medium by using methods other than the ink jet, the viscosity at 20° C. may be higher than that in the case of using the ink jet method, for example, the viscosity is in a range of 1.5 mPa·s to 100 mPa·s, is preferably in a range of 1.5 mPa·s to 50 mPa·s, and is further preferably in a range of 1.5 mPa mPa·s to 20 mPa·s. Note that, the viscosity thereof can be measured by increasing the shear rate to be in the range of 10 to 1000 in an environment of 20° C. and reading the viscosity at the time when the shear rate is 200 using a viscoelasticity testing machine MCR-300 (manufactured by Physica, Inc).

1.1.6. Effects

According to the reaction solution of the embodiment, when the reaction solution is used as a pretreatment liquid, it is possible to form an image with excellent image quality by applying an ink composition on a recording medium. More specifically, with at least one organic solvent of esters, alkylene glycol ethers, cyclic esters, and alkoxyalkyl amides, the wettability, the permeability, and the dryness of the reaction solution with respect to the recording medium is controlled, and thereby it is possible to more evenly spread and adhere the aggregating agent on the recording medium. For this reason, the reaction with components of the ink composition can proceed satisfactorily and high image quality can be formed. In addition, with the organic solvent, it is easy to maintain the solubility of the aggregating agent until the end of the process of drying the reaction solution without deteriorating degree of solubility of the aggregating agent, and the wetting spreadability can be maintained, thereby more evenly spreading and adhering the aggregating agent on the recording medium recording medium.

2. Ink Composition 2.1. Composition of Ink Composition

The reaction solution of the embodiment is used in a recording method in which recording is performed on a low absorbent recording medium or a non-absorbent recording medium by using an ink composition for ink jet recording. Hereinafter, an example of an ink composition that can be used together with the reaction solution according to the embodiment will be described. Note that, in the specification, the ink composition is simply referred to as ink in some cases.

2.1.1. Coloring Material

The ink according to the embodiment contains a coloring material. As a coloring material, a pigment and an acid dye can be preferably used from the viewpoint of excellent reactivity with the aggregating agent contained in the above-described reaction solution.

Among pigments, examples of the inorganic pigment include carbon black, iron oxide, and titanium oxide. The carbon black is not particularly limited, and examples thereof include furnace black, lamp black, acetylene black, and channel black (C.I. Pigment Black 7). In addition, examples of commercially available carbon black include No. 2300, 900, MCF88, No. 20B, No. 33, No. 40, No. 45, No. 52, MA7, MA8, MA100, and No. 2200B (which are all product names, produced by Mitsubishi Chemical Corporation, Color Black FW1, FW2, FW2V, FW18, FW200, 5150, 5160, and 5170, PRETEX 35, U, V, AND 140U, SPECIAL BLACK 6, 5, 4A, 4, and 250 (which are all product names, produced by Degussa AG), CONDUCTEX SC, RAVEN 1255, 5750, 5250, 5000, 3500, 1255, and 700 (which are all product names, produced by Columbian Carbon Japan Ltd, Columbian Chemicals), REGAL 400R, 330R, and 660R, MOGUL L, MONARCH 700, 800, 880, 900, 1000, 1100, 1300, and 1400, and ELFTEX 12 (which are all product names, produced by Cabot Corporation).

Examples of the organic pigment include a quinacridone pigment, a quinacridone quinone pigment, a dioxazine pigment, a phthalocyanine pigment, an anthrapyrimidine pigment, an anthanthrone pigment, an indanthrone pigment, a flavanthrone pigment, a perylene pigment, a diketopyrrolopyrrole pigment, a perinone pigment, a quinophthalone pigment, an anthraquinone pigment, a thioindigo pigment, a benzimidazolone pigment, an isoindolinone pigment, an azomethine pigment, and an azo pigment. Specific examples of the organic pigment include the following pigments.

Examples of pigments used for cyan ink include C.I. Pigment Blues 1, 2, 3, 15, 15:1, 15:2, 15:3, 15:4, 15:6, 15:34, 16, 18, 22, 60, 65, and 66, and C.I. Purple Blues 4 and 60.

Examples of pigments used for magenta ink include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, and 264, and C.I. Pigment Violets 19, 23, 32, 33, 36, 38, 43, and 50.

Examples of pigments used for yellow ink include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213.

As pigments used for inks of other colors such as green ink and orange ink, conventionally known pigments can be exemplified. The pigment may be used alone, or two or more kinds thereof may be used in combination.

Examples of acid dyes include an azo dye, an anthraquinone dye, a pyrazolone dye, a phthalocyanine dye, a xanthene dye, an indigoid dye, and a triphenylmethane dye. Specific examples of the acid dyes include C.I. Acid Yellows 17, 23, 42, 44, 79, and 142, C.I. Acid Reds 52, 80, 82, 249, 254, and 289, C.I. Acid Blues 9, 45, and 249, and C.I. Acid Blacks 1, 2, 24, and 94. The dye may be used alone, or two or more kinds thereof may be used in combination.

The content of the coloring material can be set to be in a range of 1% by mass to 20% by mass with respect to the total mass (100% by mass) of the ink.

In a case where a pigment is used as a coloring material, it is preferable to allow the pigment to stably disperse and maintain in water. Examples of the method includes a method of dispersing with a resin dispersant such as a water-soluble resin and/or water-dispersible resin (hereinafter, a pigment treated by the method is referred to as "resin dispersion pigment" in some cases), a method of dispersing with a dispersant (hereinafter, a pigment treated by the method is referred to as "dispersant dispersion pigment" in some cases), and a method in which a hydrophilic functional group is chemically and physically introduced to the surface of the pigment particle so that it can be dispersed and/or dissolved in water without the aforesaid resin or dispersant (hereinafter, a pigment treated by the method is referred to as "surface treated pigment" in some cases).

As the ink composition of the embodiment, a resin dispersion pigment, a dispersant dispersion pigment, or a surface treated pigment can be used, and two or more kinds thereof can be used in combination if necessary. Among them, the ink composition preferably contains a resin dispersion pigment.

Examples of the resin dispersant used for a resin dispersion pigment include polyvinyl alcohols, a polyacrylic acid, an acrylic acid-acrylonitrile copolymer, a vinyl acetate-acrylic acid ester copolymer, an acrylic acid-acrylic acid ester copolymer, a styrene-acrylic acid copolymer, a styrene-methacrylic acid copolymer, a styrene-methacrylic acid-acrylic acid ester copolymer, a styrene-α-methyl styrene-acrylic acid copolymer, a styrene-α-methyl styrene-acrylic acid-acrylic acid ester copolymer, a styrene-maleic acid copolymer, a styrene-maleic anhydride copolymer, a vinyl naphthalene-acrylic acid copolymer, a vinyl naphthalene-maleic acid copolymer, a vinyl acetate-maleic acid ester copolymer, a vinyl acetate-crotonic acid copolymer, and a vinyl acetate-acrylic acid copolymer, and salts thereof. Among them, a copolymer of a monomer having a hydrophobic functional group and a monomer having a hydrophilic functional group, and a polymer having a hydrophobic functional group and a hydrophilic functional group are preferable. As the form of the copolymer, any of a random copolymer, a block copolymer, an alternating copolymer, and a graft copolymer can be used.

The content ratio of the resin dispersant can be appropriately selected from pigments to be dispersed, and is preferably in a range of 5 parts by mass to 200 parts by mass, and is further preferably in a range of 30 parts by mass to 120 parts by mass, with respect to the content (100 parts by mass) of the pigments in the ink.

2.1.2. Resin

The ink according to the embodiment may contain a resin. The resin is a so-called fixing resin having a function of improving adhesiveness of the reaction solution with respect to a non-absorbent recording medium. Specific examples of such resin include the same resins exemplified in the description of the reaction solution, and thus the description thereof will not be repeated. The content (in terms of solid content) in a case of containing a resin can be set to be in a range of 1% by mass to 10% by mass with respect to the total mass of the ink.

2.1.3. Organic Solvent

The ink according to the embodiment may contain an organic solvent. The organic solvent has a function of increasing adhesiveness of the ink with respect to the non-absorbent recording medium, and preventing a head of the ink jet recording apparatus from being dried. Examples of the organic solvent include alcohols, alkylene glycol ethers, alkylene glycols, and pyrrolidone derivatives, and specific examples are the same as those exemplified in the description of the reaction solution, and thus the description thereof will not be repeated. The content of the organic solvent is not particularly limited, and can be set to be in a range of 1% by mass to 40% by mass with respect to the total mass of the ink. As alkylene glycols, glycol having an alkylene group having 2 to 6 carbon atoms is preferable, and a carbon number thereof is preferably equal to or greater than 4.

The ink composition of the embodiment is a liquid under the environment of 25° C., and the content of the organic solvent in which a standard boiling point is higher than 280° C. is preferably equal to or less than 5% by mass (further preferably equal to or less than 2% by mass, particularly preferably equal to or less than 1% by mass, and is still further preferably equal to or less than 0.5% by mass with respect to the total mass of the reaction solution). When the organic solvent in which the standard boiling point is higher than 280° C. is set to be equal to or less than 5% by mass, is possible to further improve the dryness of the image. The organic solvent in which the standard boiling point is higher than 280° C. may not contained in the ink composition.

As the organic solvent contained in the ink composition, an organic solvent is a liquid under the environment of 25° C., and has the standard boiling point of equal to or lower than 280° C. is preferable from the viewpoint that the image quality and the abrasion resistance are particularly excellent. The standard boiling point of the organic solvent is further preferably equal to or lower than 260° C., is still further preferably equal to or lower than 250° C., is further preferably equal to or higher than 150° C., and is still further preferably equal to or higher than 170° C.

In addition, as the organic solvent contained in the ink composition, it is preferable to use an organic solvent in which the Log P value (water octanol distribution coefficient) is equal to or less than 0, is preferably equal to or less than −0.5, and is further preferably equal to or less than −1.0. When such an organic solvent is preferably selected, the image quality and the glossiness of the recorded matter are further excellent. Further, the content of the organic solvent in which the Log P value (water octanol distribution coefficient) is equal to or less than 0 is preferably 50% by mass, is further preferably 60% by mass, and is still further preferably equal to or greater than 70% by mass, with respect to the total mass of the organic solvent contained in the ink composition. In addition, the organic solvent in which the Log P value (water octanol distribution coefficient) is equal to or less than 0 is preferably 5% by mass, is further preferably 10% by mass, and is still further preferably equal to or greater than 15% by mass, with respect to the total mass of the ink composition. Although the reason why the above-described Log P value is preferable is not clear, it is presumed that there was a tendency for the image quality and the glossiness to be particularly excellent due to some interaction between the organic solvent contained in the ink composition and the reaction solution which is adhered to the recording medium at the time of adhering the ink composition to the recording medium to which the reaction solution of the embodiment is adhered. In addition, it is preferable to set the Log P value in the above-described range from the viewpoint that the storage stability of the ink is excellent.

2.1.4. Water

The ink according to the embodiment contains water. Preferred examples of water are the same as those described in the description of the reaction solution, and thus the description thereof will not be repeated. The content of water may be, for example, equal to or greater than 50% by mass with respect to the total mass of the ink.

2.1.5. Surfactant

The ink according to the embodiment may contain a surfactant. The surfactant has a function of deteriorating the surface tension of the ink and improving the wettability with the non-absorbent recording medium. Among the surfactant, and a fluorine surfactant can be preferably used. Specific examples of the surfactant include the same surfactants exemplified in the description of the reaction solution, and thus the description thereof will not be repeated. The content of the surfactant is not particularly limited, and can be set to be in a range of 0.1% by mass and 1.5% by mass with respect to the total mass of the ink.

2.1.6. Other Components

The ink composition according to the embodiment may contain a pH adjustor, an antiseptic agent.antifungal agent, a rust inhibitor, and a chelating agent, as necessary.

2.2. Physical Properties of Ink Composition

In the ink of the embodiment, the surface tension at 20° C. is preferably in a range of 20 mN/m to 40 mN/m, and is further preferably in a range of 20 mN/m to 35 mN/m from the viewpoint of balance between the image quality and the reliability as ink for ink jet recording. Note that, the surface tension can be measured by confirming a surface tension at the time of wetting a platinum plate with a composition under an environment of 20° C. using an automatic surface tension meter CBVP-Z (manufactured by Kyowa Interface Science Co., Ltd).

In addition, from the same viewpoint, the viscosity of the ink according to the embodiment at 20° C. is preferably in a range of 3 mPa·s to 10 mPa·s, and is further preferably in a range of 3 mPa·s to 8 mPa·s. Note that, the viscosity thereof can be measured in an environment of 20° C. by using a viscoelasticity testing machine MCR-300 (manufactured by Physica, Inc).

Here, in a case where the above-described reaction solution is applied to the non-absorbent recording medium by using the ink jet recording method, the same physical properties as those of the ink for ink jet recording are preferable, and specifically, the above-described range of the surface tension and the viscosity of the ink can be set.

3. Recording Medium

The reaction solution according to the embodiment is used in the recording method in which recording is performed on a low absorbent or non-absorbent recording medium by using the ink for ink jet recording. Hereinafter, an example of the low absorbent or non-absorbent recording medium used together with the reaction solution according to the embodiment will be described.

The low absorbent or non-absorbent recording medium according to the embodiment means a recording medium having the property of not absorbing ink at all or almost not absorbing ink. Quantitatively, the recording medium used in the embodiment is a recording medium whose water absorption amount on a print surface for 30 msec$^{1/2}$ from the contact with water is 10 mL/m$^2$ or less in a Bristow method. The Bristow method is the most prevailing method as a method for measuring the liquid absorption amount in a short time and is also employed by JAPAN TAPPI, The details of the test method are described in Standard No. 51 "Paper and Paperboard—Liquid Absorbency Test Method—Bristow Method" in "JAPAN TAPPI Paper and Pulp Test Methods 2000 Edition". Examples of such a non-absorbent recording medium include a recording medium which is not provided with an ink receiving layer having an ink absorbing property on a recording surface, and a recording medium which is provided with a coating layer having a low-ink absorbing property on a recording surface.

The non-absorbent recording medium is not particularly limited, and examples thereof include a plastic film which does not have an ink absorbent layer, a recording medium in which a base material such as a sheet is coated with plastic, and a recording medium to which a plastic film is adhered. Examples of plastics here include polyvinyl chloride, polyethylene terephthalate, polycarbonate, polystyrene, polyurethane, polyethylene, and polypropylene.

The low absorbent recording medium is not particularly limited; however, examples thereof include coated paper which is provided with a coating layer for receiving an oil-based ink on the surface. The coated paper is not particularly limited; however, examples thereof include printing paper such as art paper, coated paper, and matte paper.

When the reaction solution of the embodiment is used, such an ink non-absorbent or ink low absorbent recording medium, it is possible to easily a predetermined image with high image quality and good scratch resistance.

In addition, when recording is performed on the recording medium, if the reaction solution of the embodiment is used, the wetting spreadability can be maintained even at equal to or greater than 30 mN/m, and thus it is possible to obtain excellent recorded matter. That is, when the reaction solution of the embodiment is used, it is possible to easily form a predetermined image with high image quality on the recording medium having the surface energy equal to or greater than 30 mN/m.

4. Recording Method

In the recording method of the embodiment, recording is performed on the recording medium by using the reaction solution and the ink composition.

As the first aspect of the recording method, for example, a step of applying a reaction solution and an ink composition to a recording medium can be exemplified, the reaction solution and ink are brought into contact with each other on the recording medium.

In the applying step, a reaction solution applying step of adhering the reaction solution to the image may be performed after an image recording step of recording the image formed by ink on the recording medium; however, from the viewpoint of improving the image quality of the recorded image, it is preferable to perform the image recording step after the reaction solution applying step. Hereinafter, as the applying step, a case where the recording step is performed after the reaction solution applying step will be specifically described with reference to examples.

Reaction Solution Applying Step

As described above, in the applying step, prior to the image recording step, it is preferable to perform a reaction solution applying step of previously applying a reaction solution to a region where an image is formed on the recording medium. Examples of the method of applying the reaction solution include a spin coating method, a spray coating method, a gravure roll coating method, a reverse roll coating method, a bar coating method, and an ink jet method. Among them, an ink jet method (ink jet recording method) is preferably used. In the case of using the ink jet method, the droplets of the reaction solution are discharged from the nozzles of the ink jet recording head so as to adhere to the recording medium. Since a value of the surface tension of the reaction solution described above can be easily set to be suitable for the ink jet recording method with organic solvents and additives contained in the reaction solution, there is a tendency that the discharge stability becomes excellent at the time of discharging the reaction liquid from the nozzle. In addition, in the case of using the ink jet method, even in the case where the minimum necessary amount of the reaction solution is applied to the recording medium, the reaction solution of the embodiment is particularly useful from the viewpoint that the reaction liquid can be sufficiently wet and spread on the recording medium so that the image quality becomes excellent.

A step of drying the reaction solution applied to the recording medium during and/or after the reaction solution applying step and before the image recording step may be provided. In this case, for example, when touching the reaction solution adhering to the recording medium, drying is performed to the extent that stickiness is not felt. Although the drying step of the reaction solution may be performed through natural drying, drying with heating is preferable from the viewpoint of improvement in drying speed, for example. In a case where the drying step of the reaction solution is performed with heating, the heating method is not particularly limited, and examples thereof include a printing heater mechanism that brings a heat source into contact with the recording medium, a mechanism that applies infrared radiation or microwaves (electromagnetic waves having a maximum wave length of about 2,450 MHz) to the recording medium, and a hot air drying mechanism by using a drier. The surface temperature of the recording medium in the step of drying is preferably equal to or lower than 50° C., is further preferably equal to or lower than 45° C., is still further preferably equal to or lower than 40° C., and is particularly preferably equal to or lower than 38° C.

Image Recording Step

It is preferable that the image recording step be performed after the above-described reaction solution applying step. The image recording step is a step of recording an image by adhering droplets of the ink composition to the region to which the reaction solution is applied after the above-described reaction solution applying step. With this, the compounds contained in the ink react with the aggregating agent contained in the reaction solution, and thus the coloring properties of the recorded image are improved.

In the image recording step, an image is recorded by discharging the above-described ink droplets from the nozzles of the ink jet recording head and bringing the droplets into contact with the reaction solution applied to the non-absorbent recording medium.

As a method of discharging ink or a reaction solution from a nozzle of an ink jet recording head, for example, the following methods can be exemplified. Specific examples thereof include a method that applies a strong electric field between a nozzle and an accelerating electrode placed forward of the nozzle to successively discharge droplets of an ink from the nozzle, and supplies a printing information signal to deflection electrodes while the ink droplets travels between the deflection electrodes to record an image, or a method that discharges ink droplets corresponding to the printing information signal without deflecting the ink droplets (electrostatic attraction method); a method that discharges ink droplets by applying a pressure to a liquid ink using a small pump and mechanically vibrating a nozzle using a crystal vibrator or the like; a method that applies a pressure and a printing information signal to a liquid ink using a piezoelectric element to discharge and record the ink droplets (piezo method); and a method that causes a liquid ink to be foamed with heating using a micro-electrode according to a printing information signal to discharge and record the ink droplets (thermal jet method).

In a case where the image recording step and the above-described reaction solution applying step are performed by the ink jet recording method, it is possible to use any of an ink jet recording apparatus provided with a serial type recording head and an ink jet recording apparatus provided with a line type recording head. The ink jet recording apparatus provided with a serial type recording head is to perform recording by performing scanning (pass) for discharging the ink a plurality of times while moving the recording head relative to the recording medium. Specifically, in the serial type recording head, a recording head is mounted on a carriage which moves in the width direction of the recording medium (direction intersecting the transporting direction of the recording medium), and the recording head is moved as the carriage moves so as to discharge droplets onto the recording medium. On the other hand, the ink jet recording apparatus provided with a line type recording head is to perform recording by performing scanning (pass) for discharging the ink once while moving the recording head relative to the recording medium. Specifically, in the line type recording head, a recording head is formed wider than the width of the recording medium, and thus droplets are discharged onto the recording medium without moving the recording head.

The recording method of the embodiment may include a step of drying the image on the recording medium after the image recording step. In this case, for example, when touching the reaction solution adhering to the recording medium, drying is performed to the extent that stickiness is not felt. The drying step of the image may be performed through natural drying, or may be dried with heating from the same viewpoint of described in the case of drying the reaction solution. The method of heating the image is not particularly limited, and examples thereof are the same as those exemplified in the heating method of the reaction solution.

5. Examples and Comparative Examples

Hereinafter, embodiments of the invention will be described more specifically with reference to Examples and Comparative Examples, but the invention is not limited to these examples at all.

5.1. Preparing of Ink Composition

A pigment dispersant (styrene-acrylic resin) in an amount of 30% with respect to the mass of the pigment was added to water, mixed and stirred with a magnetic stirrer for two hours, and then the mixture was thoroughly mixed by performing a dispersing treatment with a bead mill with which zirconia beads having a diameter of 0.3 mm were filled, and milled for one hour so as to prepare a pigment dispersion. Each component was put into a container so as to make the composition indicated in Table 1, stirred for one hour, and then filtered by using a membrane filter made of PTFE having a thickness of 5 μm so as to obtain ink compositions (Ink 1, Ink 2). The numerical values in Table 1 indicate % by mass, and pure water (ion exchanged water) was added such that the mass of each ink composition was 100% by mass. Here, the residue in the table contains a pigment dispersant.

TABLE 1

| Composition of ink composition | | | | | | |
|---|---|---|---|---|---|---|
| | | LogP | Standard boiling point (° C.) | Solubility to 2-pyrrolidone aqueous solution | Ink 1 | Ink 2 |
| Coloring material (pigment) | Carbon black | | | | 2 | 2 |
| Organic solvent | propylene glycol | −1.4 | 188 | ≥1% | 10 | — |
| | 1,2-butanediol | 0.06 | 210 | ≥1% | — | 10 |
| | 2-pyrrolidone | −0.85 | 241 | ≥1% | 10 | 10 |
| Surfactant | BYK348 | | | | 0.4 | 0.4 |
| | SURFYNOL DF110D | | | | 0.3 | 0.3 |
| Resin | JONCRYL 7610 | | | | 3 | 3 |
| pH adjustor | Triethanol amine | | | | 0.5 | 0.5 |
| Chelating agent | Sodium ethylenediaminetetraacetate | | | | 0.3 | 0.3 |
| Water | Ion exchanged water | | | | Residue | Residue |
| Total | | | | | 100 | 100 |

In Table 1, carbon black is MA 100 (produced by from Mitsubishi Chemical Corp), BYK 348 (produced by BYK) is a silicon surfactant, SURFYNOL DF110D (produced by Nissin Chemical Industry Co., Ltd.) is an acetylene surfactant, JONCRYL 7610 (produced by BASF Co., Ltd.) is styrene acrylic resin emulsion (values in the table are solid concentration).

5.2. Preparing of Reaction Solution

Each component was put into a container so as to make the compositions of Tables 2 and 3, mixed and stirred with a magnetic stirrer for two hours, and thoroughly mixed. After stirring for one hour, and then filtered by using a membrane filter made of PTFE having a thickness of 5 μm so as to obtain each reaction solution. The numerical values in Tables 2 and 3 indicate % by mass, and pure water (ion exchanged water) was added such that the mass of each ink composition was 100% by mass.

TABLE 2

| | | | | | Reaction solution | | | | | | |
|---|---|---|---|---|---|---|---|---|---|---|---|
| | | | | Solubility to | Examples | | | | | |
| | | | Standard | 2-pyrrolidone | | | | | | |
| | | | boiling | aqueous | | | | | | |
| | Material name | LogP | point (° C.) | solution | 1 | 2 | 3 | 4 | 5 | 6 |
| Aggregating agent | Magnesium sulfate heptahydrate | | | | 5 | 5 | 5 | 5 | 5 | 5 |
| | Maleic acid | | | | — | — | — | — | — | — |
| | UNISENCE KHE104L (solid content concentration of 20% by mass) | | | | — | — | — | — | — | — |
| Organic solvent (number on right side is formula number in specification) | 2-pyrrolidone (6) | −0.85 | 241 | ≥1% | 10 | 10 | 10 | 10 | 10 | 10 |
| | 3-methoxy-N,N-dimethyl propanamide (5) | 0.73 | 176 | ≥1% | — | — | — | — | — | — |
| | Dipropylene glycol dimethyl ether (3) | 1.02 | 171 | ≥1% | 10 | — | — | — | — | — |
| | Propylene glycol monobutyl ether (3) | 1.19 | 170 | ≥1% | — | 10 | — | — | — | — |
| | Dipropylene glycol monobutyl ether (3) | 1.13 | 231 | ≥1% | — | — | 10 | — | — | — |
| | Tripropylene glycol monomethyl ether (3) | −0.10 | 242 | ≥1% | — | — | — | 10 | — | — |
| | Diethylene glycol ethyl methyl ether (3) | 0.69 | 176 | ≥1% | — | — | — | — | 10 | — |
| | Ethylene glycol monobutyl ether acetate (1) | 1.79 | 192 | ≥1% | — | — | — | — | — | 10 |
| | Ethylene glycol diacetate (2) | 0.40 | 187 | ≥1% | — | — | — | — | — | — |
| | γ-butyrolactone (4) | −0.64 | 204 | ≥1% | — | — | — | — | — | — |
| | 3-methoxy-1-butanol (3) | 0.07 | 161 | ≥1% | — | — | — | — | — | — |
| | Polyethylene glycol monomethyl ether (3) | 0.80 | 290 | ≥1% | — | — | — | — | — | — |
| | Ethylene glycol mono-n-hexyl ether (3) | 1.57 | 208 | ≥1% | — | — | — | — | — | — |
| | Diethylene glycol monomethyl ether (3) | −1.18 | 194 | ≥1% | — | — | — | — | — | — |
| | Diethylene glycol di-n-butyl ether (3) | 1.92 | 255 | <1% | — | — | — | — | — | — |
| | Glycerin | −1.76 | 290 | ≥1% | — | — | — | — | — | — |
| | 2-propanol | 0.05 | 82 | ≥1% | — | — | — | — | — | — |
| Surfactant | BYK348 | | | | 0.4 | 0.4 | 0.4 | 0.4 | 0.4 | 0.4 |
| Water | Ion exchanged water | | | | Residue | Residue | Residue | Residue | Residue | Residue |
| | Total | | | | 100 | 100 | 100 | 100 | 100 | 100 |
| | Ink composition | | | | Ink 1 | Ink 1 | Ink 1 | Ink 1 | Ink 1 | Ink 1 |
| Evaluation results | Image | | | | AA | A | A | A | AA | A |
| | Abrasion resistance | | | | A | A | A | B | A | A |
| | Glossiness | | | | B | B | B | B | B | B |

TABLE 2-continued

| | | | | Reaction solution | | | | | | | |
|---|---|---|---|---|---|---|---|---|---|---|---|
| | | | | | | Examples | | | | | |
| | Material name | LogP | Standard boiling point (° C.) | Solubility to 2-pyrrolidone aqueous solution | 7 | 8 | 9 | 10 | 11 | 12 |
| Aggregating agent | Magnesium sulfate heptahydrate | | | | 5 | 5 | 5 | 5 | — | — |
| | Maleic acid | | | | — | — | — | — | 2 | — |
| | UNISENCE KHE104L (solid content concentration of 20% by mass) | | | | — | — | — | — | — | 25 |
| Organic solvent (number on right side is formula number in specification) | 2-pyrrolidone | (6) | −0.85 | 241 | ≥1% | 10 | 10 | 10 | — | 10 | 10 |
| | 3-methoxy-N,N-dimethyl propanamide | (5) | 0.73 | 176 | ≥1% | — | — | — | 10 | — | — |
| | Dipropylene glycol dimethyl ether | (3) | 1.02 | 171 | ≥1% | — | — | — | 10 | 10 | 10 |
| | Propylene glycol monobutyl ether | (3) | 1.19 | 170 | ≥1% | — | — | — | — | — | — |
| | Dipropylene glycol monobutyl ether | (3) | 1.13 | 231 | ≥1% | — | — | — | — | — | — |
| | Tripropylene glycol monomethyl ether | (3) | −0.10 | 242 | ≥1% | — | — | — | — | — | — |
| | Diethylene glycol ethyl methyl ether | (3) | 0.69 | 176 | ≥1% | — | — | — | — | — | — |
| | Ethylene glycol monobutyl ether acetate | (1) | 1.79 | 192 | ≥1% | — | — | — | — | — | — |
| | Ethylene glycol diacetate | (2) | 0.40 | 187 | ≥1% | 10 | — | — | — | — | — |
| | γ-butyrolactone | (4) | −0.64 | 204 | ≥1% | — | 10 | — | — | — | — |
| | 3-methoxy-1-butanol | (3) | 0.07 | 161 | ≥1% | — | — | 10 | — | — | — |
| | Polyethylene glycol monomethyl ether | (3) | 0.80 | 290 | ≥1% | — | — | — | — | — | — |
| | Ethylene glycol mono-n-hexyl ether | (3) | 1.57 | 208 | ≥1% | — | — | — | — | — | — |
| | Diethylene glycol monomethyl ether | (3) | −1.18 | 194 | ≥1% | — | — | — | — | — | — |
| | Diethylene glycol di-n-butyl ether | (3) | 1.92 | 255 | <1% | — | — | — | — | — | — |
| | Glycerin | — | −1.76 | 290 | ≥1% | — | — | — | — | — | — |
| | 2-propanol | — | 0.05 | 82 | ≥1% | — | — | — | — | — | — |
| Surfactant | BYK348 | | | | 0.4 | 0.4 | 0.4 | 0.4 | 0.4 | 0.4 |
| Water | Ion exchanged water | | | | Residue | Residue | Residue | Residue | Residue | Residue |
| | Total | | | | 100 | 100 | 100 | 100 | 100 | 100 |
| Ink composition | | | | | Ink 1 | Ink 1 | Ink 1 | Ink 1 | Ink 1 | Ink 1 |
| Evaluation results | | | Image | | AA | AA | AA | AA | AA | AA |
| | | | Abrasion resistance | | A | A | B | A | A | A |
| | | | Glossiness | | B | B | B | B | B | A |

TABLE 3

| | | | | | Examples | | | | | |
|---|---|---|---|---|---|---|---|---|---|---|
| | Material name | LogP | Standard boiling point (° C.) | Solubility to 2-pyrrolidone aqueous solution | 13 | 14 | 15 | 16 | 17 | 18 |
| Aggregating agent | Magnesium sulfate heptahydrate | | | | 5 | 5 | 5 | 5 | 5 | 5 |
| | Maleic acid | | | | — | — | — | — | — | — |
| | UNISENCE KHE104L (solid content concentration of 20% by mass) | | | | — | — | — | — | — | — |
| Organic solvent (number on right side is formula number in specification) | 2-pyrrolidone | (6) | −0.85 | 241 | ≥1% | 10 | 10 | — | 10 | 10 | 10 |
| | 3-methoxy-N,N-dimethyl propanamide | (5) | 0.73 | 176 | ≥1% | 10 | — | — | — | — | — |
| | Dipropylene glycol dimethyl ether | (3) | 1.02 | 171 | ≥1% | — | — | 10 | — | — | — |
| | Propylene glycol monobutyl ether | (3) | 1.19 | 170 | ≥1% | — | — | — | — | — | — |
| | Dipropylene glycol monobutyl ether | (3) | 1.13 | 231 | ≥1% | — | — | — | — | — | — |
| | Tripropylene glycol monomethyl ether | (3) | −0.10 | 242 | ≥1% | — | — | — | — | — | — |
| | Diethylene glycol ethyl methyl ether | (3) | 0.69 | 176 | ≥1% | — | — | — | — | — | — |
| | Ethylene glycol monobutyl ether acetate | (1) | 1.79 | 192 | ≥1% | — | — | — | — | — | — |
| | Ethylene glycol diacetate | (2) | 0.40 | 187 | ≥1% | — | — | — | — | — | — |
| | γ-butyrolactone | (4) | −0.64 | 204 | ≥1% | — | — | — | — | — | — |
| | 3-methoxy-1-butanol | (3) | 0.07 | 161 | ≥1% | — | — | — | — | — | — |
| | Polyethylene glycol monomethyl ether | (3) | 0.80 | 290 | ≥1% | — | 10 | — | — | — | — |
| | Ethylene glycol mono-n-hexyl ether | (3) | 1.57 | 208 | ≥1% | — | — | — | 10 | — | — |
| | Diethylene glycol monomethyl ether | (3) | −1.18 | 194 | ≥1% | — | — | — | — | 10 | — |
| | Diethylene glycol di-n-butyl ether | (3) | 1.92 | 255 | <1% | — | — | — | — | — | 1 |
| | Glycerin | — | −1.76 | 290 | ≥1% | — | — | — | — | — | — |
| | N,N-dimethyl propionamide | — | 0.46 | 174 | ≥1% | — | — | — | — | — | — |
| | 2-propanol | — | 0.05 | 82 | ≥1% | — | — | — | — | — | — |
| Surfactant | BYK348 | | | | 0.4 | 0.4 | 0.4 | 0.4 | 1.4 | 0.4 |
| Water | Ion exchanged water | | | | Residue | Residue | Residue | Residue | Residue | Residue |
| | Total | | | | 100 | 100 | 100 | 100 | 100 | 100 |
| | Ink composition | | | | Ink 1 | Ink 1 | Ink 1 | Ink 1 | Ink 1 | Ink 1 |
| Evaluation results | Image | | | | A | A | B | B | B | B |
| | Abrasion resistance | | | | A | C | B | A | A | A |
| | Glossiness | | | | B | A | C | B | B | C |

TABLE 3-continued

| | | | | Solubility to 2-pyrrolidone aqueous solution | Examples | Comparative Examples | | | | |
|---|---|---|---|---|---|---|---|---|---|---|
| | Material name | LogP | Standard boiling point (° C.) | | 19 | 1 | 2 | 3 | 4 | 5 |
| Reaction solution | | | | | | | | | | |
| Aggregating agent | Magnesium sulfate heptahydrate | | | | — | 5 | — | 5 | 5 | 5 |
| | Maleic acid | | | | — | — | — | — | — | — |
| | UNISENCE KHE104L (solid content concentration of 20% by mass) | | | | 25 | — | — | — | — | — |
| Organic solvent (number on right side is formula number in specification) | 2-pyrrolidone (6) | −0.85 | 241 | ≥1% | 10 | 10 | 10 | 10 | 10 | 10 |
| | 3-methoxy-N,N-dimethyl propanamide (5) | 0.73 | 176 | ≥1% | — | — | — | — | — | — |
| | Dipropylene glycol dimethyl ether (3) | 1.02 | 171 | ≥1% | 10 | — | 10 | — | — | — |
| | Propylene glycol monobutyl ether (3) | 1.19 | 170 | ≥1% | — | — | — | — | — | — |
| | Dipropylene glycol monobutyl ether (3) | 1.13 | 231 | ≥1% | — | — | — | — | — | — |
| | Tripropylene glycol monomethyl ether (3) | −0.10 | 242 | ≥1% | — | — | — | — | — | — |
| | Diethylene glycol ethyl methyl ether (3) | 0.69 | 176 | ≥1% | — | — | — | — | — | — |
| | Ethylene glycol monobutyl ether acetate (1) | 1.79 | 192 | ≥1% | — | — | — | — | — | — |
| | Ethylene glycol diacetate (2) | 0.40 | 187 | ≥1% | — | — | — | — | — | — |
| | γ-butyrolactone (4) | −0.64 | 204 | ≥1% | — | — | — | — | — | — |
| | 3-methoxy-1-butanol (3) | 0.07 | 161 | ≥1% | — | — | — | — | — | — |
| | Polyethylene glycol monomethyl ether (3) | 0.80 | 290 | ≥1% | — | — | — | — | — | — |
| | Ethylene glycol mono-n-hexyl ether (3) | 1.57 | 208 | ≥1% | — | — | — | — | — | — |
| | Diethylene glycol monomethyl ether (3) | −1.18 | 194 | ≥1% | — | — | — | — | — | — |
| | Diethylene glycol di-n-butyl ether (3) | 1.92 | 255 | <1% | — | — | — | — | — | — |
| | Glycerin | — | −1.76 | 290 | ≥1% | — | — | — | 10 | — |
| | N,N-dimethyl propionamide | — | 0.46 | 174 | ≥1% | — | — | — | — | 10 | — |
| | 2-propanol | — | 0.05 | 82 | ≥1% | — | — | — | — | — | 10 |
| Surfactant | BYK348 | | | | 0.4 | 0.4 | 0.4 | 0.4 | 0.4 | 0.4 |
| Water | Ion exchanged water | | | | Residue | Residue | Residue | Residue | Residue | Residue |
| | Total | | | | 100 | 100 | 100 | 100 | 100 | 100 |
| | Ink composition | | | | Ink 1 | Ink 1 | Ink 1 | Ink 1 | Ink 1 | Ink 1 |
| Evaluation results | Image | | | | A | C | C | C | C | C |
| | Abrasion resistance | | | | A | A | A | C | A | A |
| | Glossiness | | | | B | C | A | A | A | C |

In Tables 2 and 3, UNISENCE KHE104L is a cationic polymer solution having a solid content concentration of 20% which is produced by Senka. In tables, regarding UNISENCE KHE104L, not the solid content is indicated but the addition amount (that is, 25% by mass corresponds to 5% by mass of the solid content). In addition, as polyethylene glycol monomethyl ether, HIGH MALL PM produced by TOHO Chemical Industry Co., Ltd. was used. This is a solvent represented by $CH_3O(CH_2CH_2O)_nH$ (n=approximately 4 (average value)).

5.3. Evaluation Method 5.3.1. Production of Recorded Matter

Evaluation of Image Quality

The recording medium was loaded into a remodeled machine of an ink jet printer: PX-G930 (manufactured by Seiko Epson Corporation), and the recording medium was ink jet coated with the reaction solution in each example, filled in a head, at a resolution of 720×720 dpi with an adhesion amount of 1.0 mg/inch$^2$. Then, the surface to which the reaction solution was adhered was coated with the ink composition (black) (Ink 1 or Ink 2) filled in the head, filled in the head, at a resolution of 720×720 dpi with an adhesion amount of 10.0 mg/inch$^2$. During the recording step, a surface temperature of the recording medium was adjusted to be 35° C. In addition, after the recording step, the recorded matter was discharged from the printer, and then was dried at 80° C. for ×5 minutes. The recording medium used here is glossy polyvinyl chloride sheet (Model: SV-G-1270G, manufactured by Roland DG Corporation).

Abrasion Resistance Test and Glossiness Evaluation

The recording medium was loaded into an ink jet printer: PX-G930 (manufactured by Seiko Epson Corporation), and the recording medium was ink jet coated with the reaction solution in each example, filled in a head, at a resolution of 720×720 dpi with an adhesion amount of 1.0 mg/inch$^2$. Then, the surface to which the reaction solution was adhered was coated with the ink composition (black) (Ink 1 or Ink 2) filled in the head, filled in the head, at a resolution of 720×720 dpi with an adhesion amount of 10.0 mg/inch$^2$. During the recording step, a surface temperature of the recording medium was adjusted to be 35° C. In addition, after the recording step, the recorded matter was discharged from the printer, and then was dried at 80° C. for ×5 minutes. The recording medium used here is glossy polyvinyl chloride sheet (Model: SV-G-1270G, manufactured by Roland DG Corporation).

5.3.2. Evaluation of Image Quality

As described above, a solid pattern of 10 mm×10 mm was recorded, the presence or absence of printing unevenness was visually confirmed and evaluated according to the following criteria, and the results are indicated in Tables 2 and 3.

AA: It is not observed that ink density is uneven in pattern

A: Small unevenness was observed

B: Large unevenness was observed, but there is no white streaks

C: White streaks and unevenness were observed (here, AA, A, and B are assumed to be in a practical range)

5.3.3. Evaluation of Abrasion Resistance

As described above, a solid pattern of 20 mm×80 mm was recorded, and the abrasion resistance was evaluated using a color fastness rubbing tester AB-301 (trade name, manufactured by TESTER SANGYO CO., LTD). Specifically, the surface of the recording medium having an image recorded thereon was rubbed with a friction block having a white cloth (JIS L 0803 standard) attached thereto, until the coating film is peed off by adding a load of 300 g or 30 times in a reciprocating manner. Then, the state where the image (coating film) on the surface of the recording medium was peeled off was visually observed. The evaluation criteria are as follows and the results are indicated in Table 2 and Table 3.

A: Coating film was not peeled off even when the surface was rubbed 30 times in a reciprocating manner B: Coating film was peeled off, when the surface was rubbed 10 to 29 times in a reciprocating manner C: Coating film was peeled off, when the surface was rubbed within 9 times in a reciprocating manner 5.3.4. Evaluation of Glossiness The glossiness at 60° was measured by using a glossiness measuring device: GM-268 Plus (manufactured by Konica Minolta, Inc.). The evaluation criteria are as follows and the results are indicated in Table 2 and Table 3.

A: equal to or greater than 60

B: equal to or greater than 45 and less than 60

C: less than 45

5.4. Evaluation Results

In the case of using a reaction solution in each example, which contains any one or more kinds of organic solvents from esters, alkylene glycol ethers, cyclic esters, and alkoxyalkyl amides; and a aggregating agent, it was possible to obtain a recorded matter with high image quality in each example. In contrast, in the reaction solutions in Comparative Examples 1, 3, and 4, which does not contain at least one kind of organic solvent from esters, alkylene glycol ethers, cyclic esters, and alkoxyalkyl amides, the image quality was not sufficiently obtained. In addition, with reference to Comparative Example 2, it was found that the image quality could not be improved only by containing alkylene glycol ethers without a aggregating agent.

On the other hand, when comparing with the reaction solutions in Examples, in a case (Example 9) of containing 3-methoxy-1-butanol (monoether), it was found that the scratch resistance was slightly inferior to that of the diether.

Further, when comparing Examples 10 and 15, it was found that it was possible to obtain a recorded matter with high image quality even in a case where 2-pyrrolidone of the compound represented by Formula (6) was not contained.

In addition, in Example 18, although it was possible to obtain a recoded matter with good image quality and scratch resistance, the glossiness was not sufficient. The reason for this in Example 18 is that the solubility of the organic solvent with respect to the reaction solution was deteriorated, and thus the content of the organic solvent was reduced; however, the reaction solution was still slightly cloudy at the time of preparation, the composition of the reaction solution became uneven, and minute irregularities and the like occurred on the surface of the recorded matter. In addition, in a case of Example 17, the wetting spreadability of the reaction solution is not sufficient, and thus it is considered that the image quality and the glossiness are slightly deteriorated. Further, in Example 14 in which polyethylene glycol monomethyl ether having a boiling point of 290° C. is used, the dryness was poor, and thus the abrasion resistance was deteriorated while the image quality was good.

In addition, regarding both of the reaction solution in Example 17 in which diethylene glycol monomethyl ether having a Log P value (water octanol distribution coefficient) smaller than −1 was used, and the reaction solution in Example 18 in which the solubility of diethylene glycol di n-butyl ether with respect to 2-pyrrolidone is less than 1% was used, the glossiness was deteriorated.

In addition, from the comparison between Example 19 and Example 12, it was found that as an organic solvent contained in the ink composition, an organic solvent having a low Log P value is more excellent in the image quality and the glossiness. In addition, when the storage stability of Ink 1 and Ink 2 was confirmed separately, there was a tendency that as compared with Ink 1, Ink 2 has a large increase in the viscosity of ink at 25° C. before and after storage when performing storage test at 60° C. for ×7 days and was inferior in terms of the storage stability.

The invention is not limited to the above-described embodiments, and various modifications are possible. For example, the invention includes a configuration substantially the same as that described in the embodiment (for example, a configuration having the same function, method, and result, or a configuration having the same object and effect). Further, the invention includes a configuration in which non-essential parts of the configuration described in the embodiment are replaced. Further, the invention includes a configuration that can achieve the same effects as the configuration described in the embodiment, or a configuration that can achieve the same object. In addition, the invention includes a configuration in which a well-known technique is added to the configuration described in the embodiment.

The entire disclosure of Japanese Patent Application No. 2016-191289, filed Sep. 29, 2016 is expressly incorporated by reference herein.

What is claimed is:

1. A reaction solution comprising:
    any one or more kinds of organic solvents from esters, alkylene glycol ethers, cyclic esters, and alkoxyalkyl amides; and
    an aggregating agent which aggregates components of an ink composition,
    wherein the reaction solution is used for a recording method performed by using the ink composition; and
    the one or more kinds of organic solvents includes an organic solvent of which a degree of solubility is equal to or greater than 1% by mass with respect to an aqueous solution having a concentration of 2-pyrrolidone of 20% by mass.

2. The reaction solution according to claim 1, wherein the recording method is performed by discharging the ink composition and the reaction solution from an ink jet recording head so as to be adhered to a recording medium.

3. The reaction solution according to claim 1, wherein the reaction solution is an aqueous composition containing water.

4. The reaction solution according to claim 1, wherein the organic solvent includes an organic solvent having a standard boiling point in a range of 150° C. to 280° C.

5. The reaction solution according to claim 1, wherein the total content of the organic solvent is in a range of 1% by mass to 30% by mass with respect to the total mass of the reaction solution.

6. The reaction solution according to claim 1, wherein the total content of the organic solvent of which the standard boiling point is higher than 280° C. is equal to or less than 5% by mass with respect to the total mass of the reaction solution.

7. The reaction solution according to claim 1, wherein a total content of the organic solvent of which the standard boiling point is higher than 280° C. and contained in the ink composition is equal to or less than 5% by mass with respect to the total mass of the ink composition.

8. The reaction solution according to claim 1, which contains, as the organic solvent, an organic solvent having a water octanol distribution coefficient in a range of −1 to 4.

9. The reaction solution according to claim 1,
    wherein the recording method is to perform recording on an ink non-absorbent or ink low absorbent recording medium.

10. The reaction solution according to claim 1,
    wherein a surface energy of the recording medium is equal to or greater than 30 mN/m.

11. The reaction solution according to claim 1, which contains, as the aggregating agent, any one or more of a polyvalent metal salt, an organic acid, and a cationic compound.

12. The reaction solution according to claim 1, which satisfies at least one of (A), (B):
    (A) the reaction solution further contains, as an organic solvent, a cyclic amide;
    (B) the organic solvent contains an alkoxyalkyl amide.

13. The reaction solution according to claim 1,
    wherein the ink composition contains an organic solvent having a water octanol distribution coefficient of equal to or less than 0.

14. An ink jet recording method performed by using the ink composition and the reaction solution according to claim 1.

15. The reaction solution according to claim 1, further comprising a cyclic amide as an organic solvent.

16. The reaction solution according to claim 1, which satisfies at least one of (A), (B):
    (A) the reaction solution further contains, as an organic solvent, a cyclic amide;
    (B) the organic solvent contains an alkoxyalkyl amide.

17. A reaction solution comprising:
    any one or more kinds of organic solvents from esters, alkylene glycol ethers, cyclic esters, and alkoxyalkyl amides; and
    an aggregating agent which aggregates components of an ink composition,
    wherein the reaction solution is used for a recording method performed by using the ink composition, and
    wherein a total content of the organic solvent of which the standard boiling point is higher than 280° C. is equal to or less than 5% by mass with respect to the total mass of the reaction solution.

18. The reaction solution according to claim 17,
    wherein the recording method is performed by discharging the ink composition and the reaction solution from an ink jet recording head so as to be adhered to a recording medium.

19. The reaction solution according to claim 17, wherein the reaction solution is an aqueous composition containing water.

20. The reaction solution according to claim 17,
    wherein the organic solvent includes an organic solvent having a standard boiling point in a range of 150° C. to 280° C.

21. The reaction solution according to claim 17,
    wherein the total content of the organic solvent is in a range of 1% by mass to 30% by mass with respect to the total mass of the reaction solution.

22. The reaction solution according to claim 17, which contains, as the organic solvent, an organic solvent of which a degree of solubility is equal to or greater than 1% by mass with respect to an aqueous solution having a concentration of 2-pyrrolidone of 20% by mass.

23. The reaction solution according to claim 17, wherein a total content of the organic solvent of which the standard boiling point is higher than 280° C. and contained in the ink composition is equal to or less than 5% by mass with respect to the total mass of the ink composition.

24. The reaction solution according to claim 17, which contains, as the organic solvent, an organic solvent having a water octanol distribution coefficient in a range of −1 to 4.

25. The reaction solution according to claim 17,
wherein the recording method is to perform recording on an ink non-absorbent or ink low absorbent recording medium.

26. The reaction solution according to claim 17,
wherein a surface energy of the recording medium is equal to or greater than 30 mN/m.

27. The reaction solution according to claim 17, which contains, as the aggregating agent, any one or more of a polyvalent metal salt, an organic acid, and a cationic compound.

28. The reaction solution according to claim 17,
wherein the ink composition contains an organic solvent having a water octanol distribution coefficient of equal to or less than 0.

29. An ink jet recording method performed by using the ink composition and the reaction solution according to claim 17.

30. The reaction solution according to claim 17, further comprising a cyclic amide as an organic solvent.

* * * * *